United States Patent
Dobashi

(10) Patent No.: US 11,474,656 B2
(45) Date of Patent: Oct. 18, 2022

(54) POSITION DETECTOR

(71) Applicant: Wacom Co., Ltd., Saitama (JP)

(72) Inventor: Kei Dobashi, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/484,539

(22) Filed: Sep. 24, 2021

(65) Prior Publication Data

US 2022/0011893 A1 Jan. 13, 2022

Related U.S. Application Data

(63) Continuation of application No. 16/570,982, filed on Sep. 13, 2019, now Pat. No. 11,150,773.

(30) Foreign Application Priority Data

Oct. 15, 2018 (JP) .............................. JP2018-193952

(51) Int. Cl.
*G06F 3/046* (2006.01)
*G01D 5/20* (2006.01)
*G02F 1/1333* (2006.01)

(52) U.S. Cl.
CPC ........... *G06F 3/046* (2013.01); *G01D 5/2053* (2013.01); *G02F 1/13338* (2013.01)

(58) Field of Classification Search
None
See application file for complete search history.

(56) References Cited

U.S. PATENT DOCUMENTS

| 4,988,837 A * | 1/1991 | Murakami .............. G06F 3/046 345/173 |
| 2016/0026039 A1* | 1/2016 | Sakai ................ G02F 1/133555 345/1.3 |
| 2018/0046305 A1* | 2/2018 | Kang .................... G06F 3/0446 |

FOREIGN PATENT DOCUMENTS

| JP | H01263814 A | 10/1989 |
| JP | H5-181594 A | 7/1993 |
| JP | 2006-154338 A | 6/2006 |
| JP | 2009199558 A | 9/2009 |
| JP | 2009246819 A | 10/2009 |

OTHER PUBLICATIONS

Notice of Reasons for Refusal for JP Application No. 2018-193952, dated Aug. 31, 2022, with English translation (6 pages total).

* cited by examiner

*Primary Examiner* — Stephen T. Reed
(74) *Attorney, Agent, or Firm* — Seed Intellectual Property Law Group LLP

(57) ABSTRACT

A position detector as one electronic part is configured by clamping and holding a stacking body obtained by stacking a display comprising a resin frame and an LCD part and a position detecting sensor by a back bezel and a front bezel. By using an auxiliary member, an upper surface frame part of the front bezel is kept from covering a part, in a loop coil, that is disposed outside an effective display area and relates to detection of an indicated position at an end part of the effective display area.

12 Claims, 5 Drawing Sheets

SECTIONAL VIEW OF LOOP COIL L1

POSITION DETECTOR

BACKGROUND

Technical Field

This disclosure relates to a position detector mounted, as an input-output device, in an information processing device configured to include a thin video display device, such as a liquid crystal display (LCD) for example, and a position detecting sensor.

Description of the Related Art

Thin video display devices such as LCDs are mounted in portable information terminals typified by mobile phone terminals. In Japanese Patent Laid-open No. 2006-154338 (hereinafter, referred to as Patent Document 1), a disclosure relating to a video display device that is configured by clamping an LCD display panel and a backlight unit by an upper frame and a lower frame which are made of a metal and is easy to assemble is disclosed. This video display device implements a video display device as one electronic part (unit) in which the LCD display panel and the backlight unit can be integrally treated.

In recent years, high-function mobile phone terminals called a smartphone or the like and information processing devices called a tablet personal computer (PC) or the like have come to be widely used. These pieces of electronic equipment are equipped with a thin video display device with a comparatively large display screen and a position detecting sensor (full-screen sensor) corresponding to the display screen of this video display device, which allows them to function as an input-output device. Furthermore, as in the video display device described in Patent Document 1 described above, configuring and using a position detector as one electronic part including a thin video display device and a position detecting sensor has also been carried out.

As depicted in a sectional view of FIG. 6A, an existing position detector 3 has a configuration in which a stacking body obtained by stacking a position detecting sensor 33, a resin frame (plastic layer) 34, and an LCD part 35 in that order from the lower side is clamped by a back bezel 31 and a front bezel 32. The LCD part 35 is a device configured through stacking of liquid crystal cell, backlight, optical film, and so forth over the resin frame 34, and a display is configured by the resin frame 34 and the LCD part 35.

The back bezel 31 is a component that comprises a bottom plate 31a and a side surface frame part 31b and has a tray shape. The front bezel 32 is a component that comprises an upper surface frame part 32a and a side surface frame part 32b and has a picture frame shape. The inside of the upper surface frame part 32a is an opening part to allow a display screen 3D of the LCD part 35 to be exposed. The back bezel 31 and the front bezel 32 are components made of a metal and are not easily deformed. They firmly clamp (press) the above-described stacking body, which can configure the position detector 3 as one electronic part.

Furthermore, in the case of mounting the position detector 3 in electronic equipment, as depicted in FIG. 6A, a polarization film 41 is disposed on the display screen 3D of the LCD part 35 and a sponge (PORON) 42 is disposed on the frame part of the front bezel 32 on the upper surface side. Moreover, a surface glass 2 is placed on the sponge 42. The upper surface of this surface glass 2 serves as an operation surface based on an electronic pen. An air layer is set between the polarization film 41 and the surface glass 2 in some cases. In other cases, a resin material layer 43 obtained by filling with a resin material is set therebetween by so-called direct bonding to reduce eyesore reflections. Moreover, a motherboard on which various circuit parts are mounted is located under the position detector 3 although not depicted in FIGS. 6A and 6B.

As depicted in FIG. 6A, in the case of a configuration in which the position detecting sensor 33 is disposed on the lower side of the video display device such as the LCD part 35, a sensor of the electromagnetic induction system (electromagnetic resonance technology (EMR) system) is used as the position detecting sensor 33. To the position detecting sensor 33 of the electromagnetic induction system, indication input is carried out by using an electronic pen of the electromagnetic induction system. The position detecting sensor 33 of the electromagnetic induction system is a sensor in which plural loop coils are disposed in each of an X-axis direction (horizontal direction) and a Y-axis direction (vertical direction). Furthermore, in this position detecting sensor 33, a transmission period in which power is supplied to the plural loop coils sequentially and a magnetic field (signal) is generated and a reception period in which the supply of the power is stopped and a magnetic field (signal) from the external is received are alternately set.

Meanwhile, the electronic pen corresponding to the position detecting sensor 33 of the electromagnetic induction system includes a resonant circuit comprising a coil and a capacitor. This electronic pen functions to generate a magnetic field (signal) through flowing of a current in the coil of the resonant circuit mounted in this electronic pen in response to the magnetic field from the position detecting sensor 33 and transmit the magnetic field (signal) to the position detecting sensor 33. On the side of the position detecting sensor 33, the magnetic field (signal) from this electronic pen is received in the reception period, and the position indicated by this electronic pen is detected according to the position of the loop coil that has received the magnetic field.

However, if a metal exists near the loop coil configuring the position detecting sensor of the electromagnetic induction system or the electronic pen, the magnetic field (signal) transmitted and received between the loop coil and the electronic pen will be disturbed, and detection of the correct indicated position will be inhibited in some cases. This problem possibly occurs also in the position detector 3 with the configuration depicted in FIG. 6A. This is because the position detector 3 described by using FIG. 6A has the configuration in which the position detecting sensor 33 and the LCD part 35 are both clamped by the back bezel 31 and the front bezel 32 which are made of a metal.

FIG. 6B depicts a configuration when the upper left end part of the position detector 3 described by using FIG. 6A is viewed from the upper side thereof. Parts that are actually visible are depicted by solid lines, and parts that are invisible because another constituent part exists on the upper side are depicted by dotted lines. As depicted in FIG. 6B, the upper surface frame part 32a of the front bezel 32 is located at the uppermost part, and the LCD part 35 is located in such a manner that the display screen 3D is exposed from the opening part formed to be surrounded by the upper surface frame part 32a. The inside of the display screen 3D of the LCD part 35 is an effective display area EAr.

Furthermore, on the lower side of the LCD part 35, the position detecting sensor 33 of the electromagnetic induction system formed by disposing plural loop coils in the X-axis direction (horizontal direction) and the Y-axis direction (vertical direction) at predetermined intervals is located.

In the loop coils disposed in the X-axis direction (X-axis direction loop coil group), the parts extended in the Y-axis direction are disposed near the display screen and directly under the display screen. The X-axis direction loop coil group is used for identifying the indicated position in the X-axis direction (horizontal direction) on the display screen. The parts extended in the X-axis direction in each loop coil of the X-axis direction loop coil group are disposed in a region outside the upper end of the display screen 3D and a region outside the lower end.

Meanwhile, in the loop coils disposed in the Y-axis direction (Y-axis direction loop coil group), the parts extended in the X-axis direction are disposed at positions corresponding to the display screen near the display screen and directly under the display screen. The Y-axis direction loop coil group is used for identifying the indicated position in the Y-axis direction (vertical direction) on the display screen. The parts extended in the Y-axis direction in each loop coil of the Y-axis direction loop coil group are disposed in a region outside the left end of the display screen 3D and a region outside the right end. Furthermore, in FIG. 6B, for simplification of description, loop coils L1 and L2 disposed in the X-axis direction (horizontal direction) are depicted, and diagrammatic representation of the loop coils disposed in the Y-axis direction (vertical direction) is omitted.

In the case of the example depicted in FIG. 6B, in the loop coil L1 of the X-axis direction loop coil group, the left part is located at the left end of the position detecting sensor 33 (outside the effective display area EAr), and the right part is located in the effective display area EAr of the display screen 3D of the LCD part 35. Furthermore, in the loop coil L2 of the X-axis direction loop coil group, the left part is located outside the display screen 3D of the LCD part 35 and near the left end of the effective display area EAr, and the right part is located in the effective display area EAr of the display screen 3D of the LCD part 35.

Moreover, as described above, in order to clamp the stacking body including the LCD part 35 by the back bezel 31 and the front bezel 32, the upper surface frame part 32a of the front bezel 32 forming the opening part protrudes to the vicinity of the effective display area EAr of the display screen of the LCD part 35. The widths of the upper surface frame part 32a are considerably wide widths as depicted by widths WT and WY in FIG. 6B. In this case, the left parts of the loop coils L1 and L2 of the X-axis direction loop coil group are both covered by the upper surface frame part 32a of the front bezel 32. For this reason, between the left parts of the loop coils L1 and L2 of the X-axis direction loop coil group and the electronic pen, the upper surface frame part 32a of the front bezel 32 serves as a blocking object, and it is impossible to properly carry out transmission and reception of the magnetic field (signal).

As position detection methods by use of the position detecting sensor of the electromagnetic induction system, there are three-point method and two-point method. The three-point method is a method in which the position indicated by an electronic pen is accurately calculated based on the received-signal level of three loop coils, i.e., the loop coil that receives a signal from the electronic pen most intensely and the loop coils on both sides of the loop coil. The two-point method is a method in which, when it is impossible to obtain a received signal from three loop coils, the position indicated by an electronic pen is calculated based on the received-signal level of two loop coils. This two-point method is used for detection of the indicated position at an end part of the effective display area EAr. Details of the three-point method and the two-point method, which are position detection methods in the position detecting sensor of the electromagnetic induction system, are disclosed in Japanese Patent Laid-open No. H5(1993)-181594 and so forth for example.

However, as depicted in FIG. 6B, the left part of the loop coil L2 located near the effective display area EAr although existing outside the effective display area EAr is covered by the upper surface frame part 32a of the front bezel 32. For this reason, the left part of the loop coil L2 located near the effective display area EAr cannot properly carry out transmission and reception of the magnetic field (signal) with the electronic pen. Thus, in electronic equipment using the position detector 3 with the configuration depicted in FIGS. 6A and 6B, the possibility that it is impossible to properly detect indication by the electronic pen at an end part of the effective display area EAr arises. Although the number of opportunities of indicating an end part of the effective display area EAr by the electronic pen will be small, it is important to enable accurate detection of indication wherever the indication is carried out by the electronic pen in the effective display area EAr.

BRIEF SUMMARY

One or more embodiments are directed to a position detector including at least a thin video display device and a position detecting sensor, enabling accurate detection of an indicated position even when an end part of an effective display area of this video display device.

Provided is a position detector including a display device including a thin display component having a flat display screen and a resin frame that fixes the display component and a position detecting sensor that is configured by arranging a plurality of loop coils in each of a first direction and a second direction that intersect each other and is disposed on the lower side of the display in a stacking manner. The position detecting sensor detects an indicated position in an effective display area on the display screen. The position detector includes also a lower holding member set on the lower side of the display device and the position detecting sensor, and an upper holding member that is formed of a metal material and has an opening part that exposes the display screen. The upper holding member is set on the upper side of the display device and the position detecting sensor. The position detector includes also an auxiliary member that is formed of a material that does not affect reception of a signal through the loop coil and is for fixing the display component and the resin frame. A frame part at a periphery of the opening part of the upper holding member covers part of the resin frame and the display is fixed by the lower holding member and the upper holding member.

According to this position detector, the display component and the resin frame are fixed by the auxiliary member to become the display device in which they are not separated. Furthermore, the position detector as one electronic part is configured by clamping and holding the stacking body obtained by stacking of the display and the position detecting sensor by the lower holding member and the upper holding member. In this case, by using the auxiliary member, the frame part at the periphery of the opening part of the upper holding member is kept from covering a part that is part of the loop coil disposed outside the effective display area on the display screen and relates to detection of an indicated position at an end part of the effective display area.

Due to this, the part that is the part of the loop coil disposed outside the effective display area of the display screen and relates to detection of an indicated position at an end part of the effective display area of the display screen is not affected by the upper holding member formed of a material that possibly affects reception of a signal. Therefore, it is possible to implement a position detector with high reliability with which a position indicated by an electronic pen at an end part of the effective display area of the display screen can also be properly detected.

DETAILED DESCRIPTION

One embodiment of a position detector of this disclosure will be described below with reference to the drawings. The position detector is configured in such a manner that at least a thin display component and a position detecting sensor are integrated and is allowed to be treated as one electronic part. Furthermore, the position detector is mounted in a tablet PC or a high-function mobile phone terminal called smartphone or the like and is used.

Example of Electronic Equipment in Which Position Detector is Mounted

Figure 1:
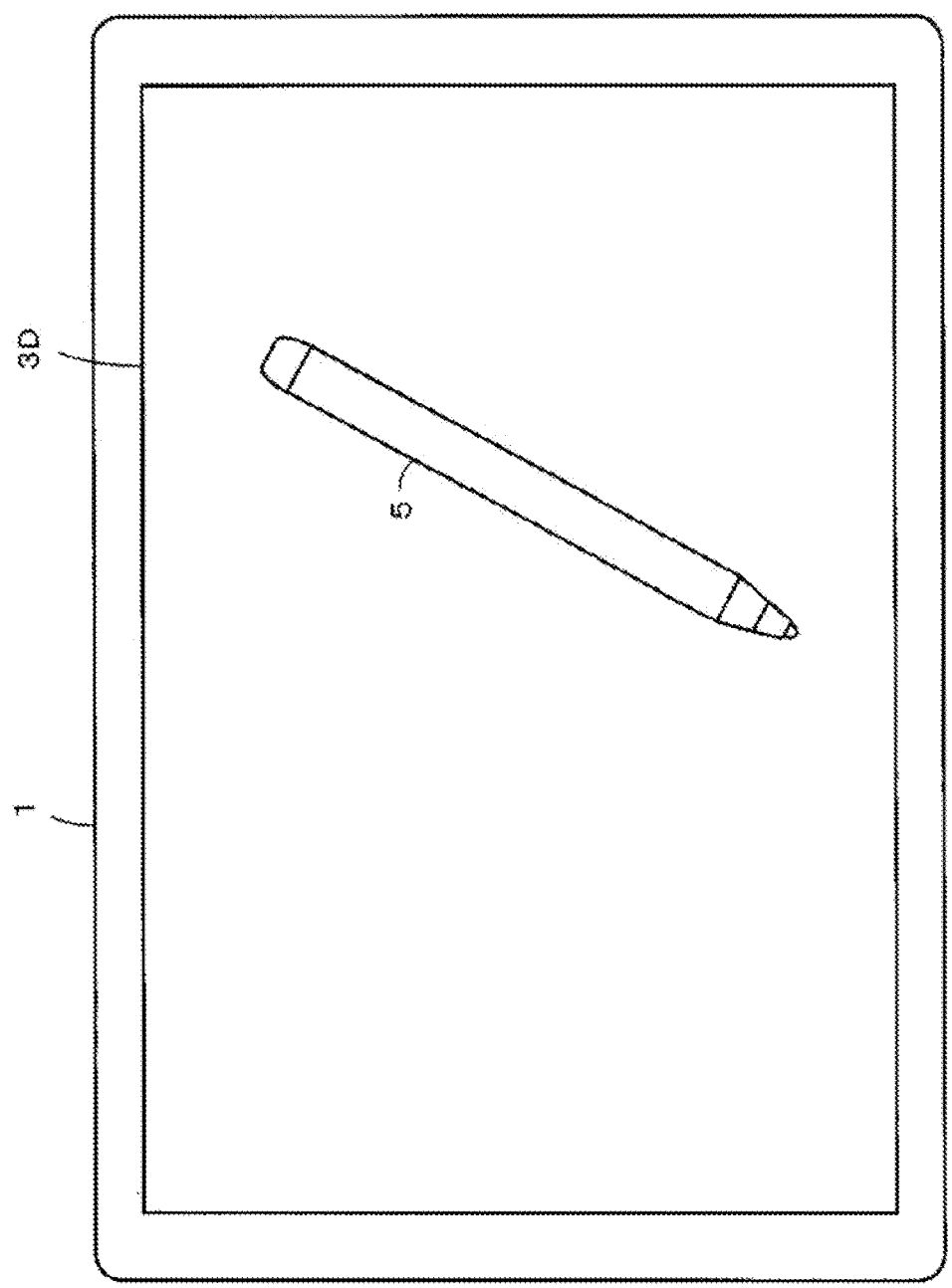
FIG. 1 is a diagram depicting the appearance of a tablet PC as an example of electronic equipment in which a position detector of an embodiment is mounted.

FIG. 1 is a diagram depicting the appearance of a tablet PC 1 as an example of electronic equipment in which the position detector of the embodiment is mounted. The tablet PC 1 is configured through mounting of the position detector including a thin display device having a comparatively large display screen 3D and a position detecting sensor that detects an indicated position on the display screen 3D. In the tablet PC 1 of this embodiment, an electronic pen 5 is used for indication input. That is, an input-output device of the tablet PC is implemented by the position detector and the electronic pen 5.

Furthermore, by carrying out operation in such a manner that the pen tip of the electronic pen 5 is brought into contact with the display screen 3D and is moved, the indicated position is detected through the position detecting sensor, and drawing input of characters, figures, symbols, and so forth can be carried out. Specifically, it is possible to give marks, notes, and so forth onto various images such as map and drawing displayed on the display screen 3D by using the electronic pen 5 and store and hold them with the displayed images, or the like. Moreover, it is also possible to carry out indication input to icons, operation buttons, menu items, and so forth displayed on the display screen 3D by using the electronic pen 5.

Figure 2:
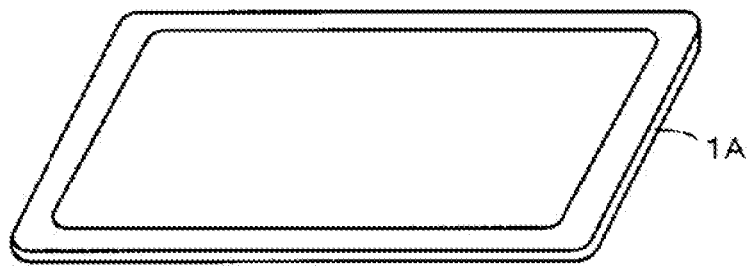
FIG. 2 is an exploded diagram for explaining an example of the internal configuration of the tablet PC in which the position detector of the embodiment is mounted.
Figure 2:
Figure 2:
Figure 2:
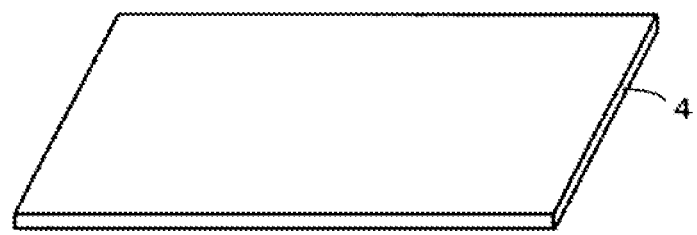
Figure 2:
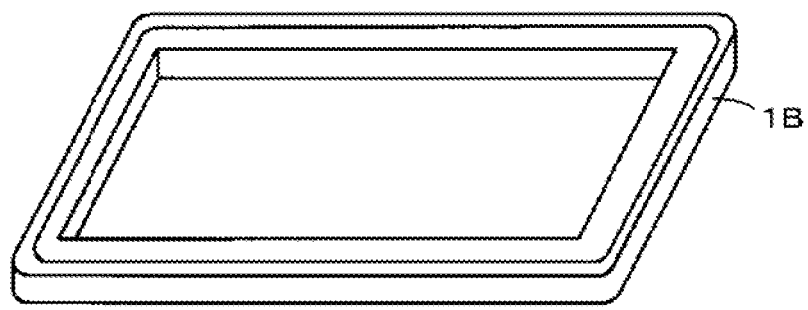

FIG. 2 is an exploded diagram for explaining an example of the internal configuration of the tablet PC 1 in which a position detector 3A of the embodiment is mounted. As depicted in FIG. 2, the tablet PC 1 is configured as follows. A motherboard 4 is housed at the lowermost layer in a chassis 1B and the position detector 3A is placed thereon. Then, a surface glass 2 is placed thereon and a front panel 1A is placed at the uppermost part. That is, the motherboard 4, the position detector 3A, and the surface glass 2 are stacked in that order from the lower side in the chassis 1B, and they are enclosed in the chassis 1B by the front panel 1A.

On the motherboard 4, various circuits and device units such as control circuit (controller), storing device, communication circuit, display control circuit, and position detecting circuit are mounted although not depicted in the diagram. The position detector 3A is a unit to which this disclosure is applied. As described in detail later, the position detector 3A is configured in such a manner that at least a thin display device and a position detecting sensor are integrated and is allowed to be treated as one electronic part.

The control circuit of the motherboard 4 is configured through connecting of central processing unit (CPU), read only memory (ROM), random access memory (RAM), non-volatile memory, and so forth through a bus and controls the whole of the tablet PC 1. The storing device unit of the motherboard 4 is comprises a semiconductor memory with large storage capacity and a driver thereof for example and carries out writing, reading, deletion, and so forth of program and data under control by the control circuit. The communication circuit of the motherboard 4 accesses the Internet for example and enables transmission and reception of electronic mails, access to Web pages, and so forth.

Furthermore, the display control circuit of the motherboard 4 carries out various kinds of display control for the display device of the position detector 3A. Therefore, the display device of the position detector 3A and the display control circuit of the motherboard 4 configure the display component of the tablet PC 1. The position detecting circuit of the motherboard 4 detects the position indicated by the electronic pen 5 based on detection output from the position detecting sensor of the position detector 3A. Thereby, information input by use of the electronic pen 5 is enabled. That is, a position detecting device is implemented by the position detecting sensor of the position detector 3A and the position detecting circuit of the motherboard 4.

In addition, the surface glass 2 forms an operation surface based on the electronic pen 5 and implements a function of protecting the display screen of the display device mounted in the position detector 3A. Moreover, an opening part through which the display screen 3D of the display device is exposed is made in the front panel 1A and the display screen 3D of the display device of the position detector located on the lower side of the surface glass 2 is allowed to be viewed through this opening part.

In this embodiment, the display used in the position detector 3A is a liquid crystal display (LCD). Furthermore, the position detecting sensor used in the position detector 3A is a unit of the electromagnetic induction system and is a unit configured by disposing plural loop coils in an X-axis direction and a Y-axis direction at predetermined intervals as described by using FIG. 6B. Thus, the electronic pen 5 includes a resonant circuit comprising a coil and a capacitor and can carry out mutual transmission and reception of a magnetic field (signal) with the position detecting sensor of the electromagnetic induction system.

Figure 6A:
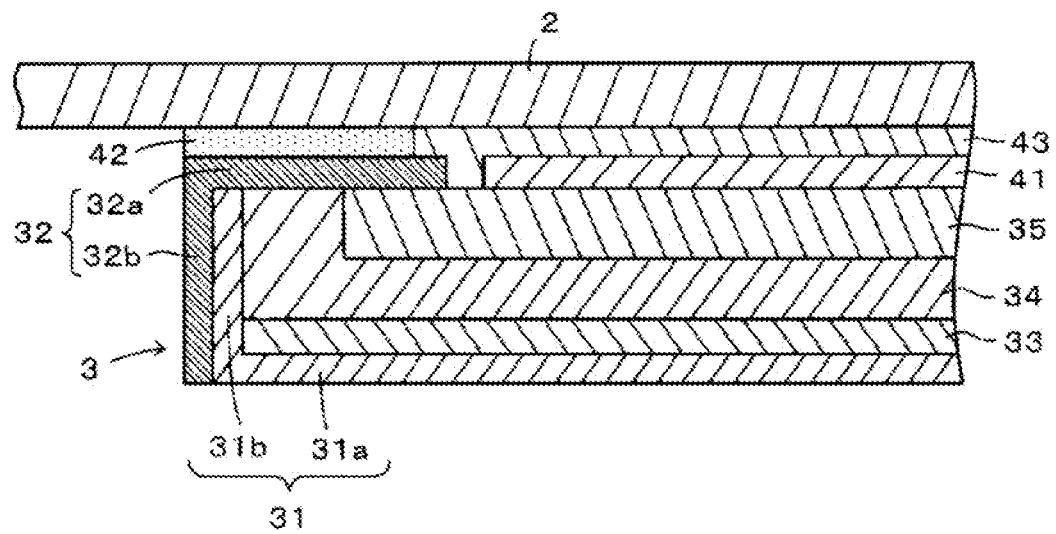
FIGS. 6A and 6B are diagrams for explaining an existing example of a position detector.
Figure 6B:
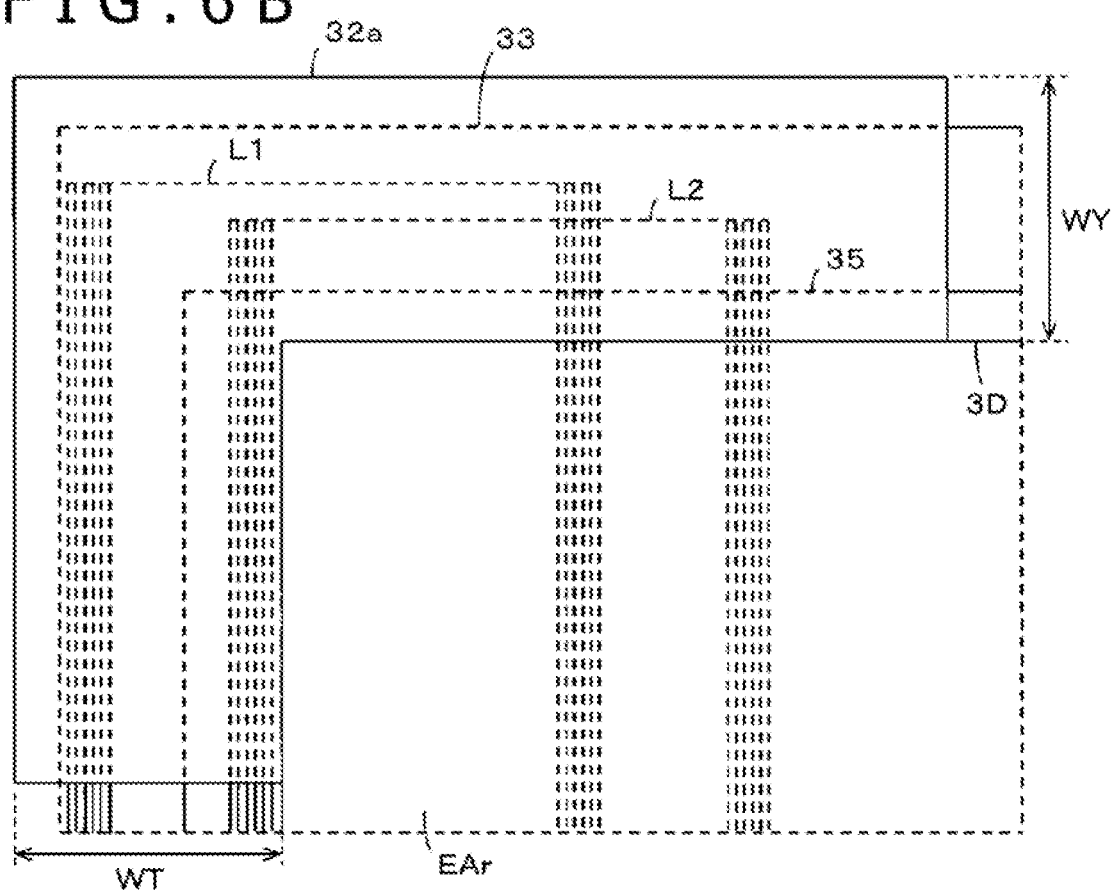

Furthermore, the position detector 3A of this embodiment can properly detect the position indicated by the electronic pen 5 even at an end part of the effective display area of the display screen differently from the existing position detector 3 described by using FIGS. 6A and 6B. The configuration of the position detector 3A of the first embodiment will be described below.

Configuration of Position Detector 3A of First Embodiment

Figure 3A:
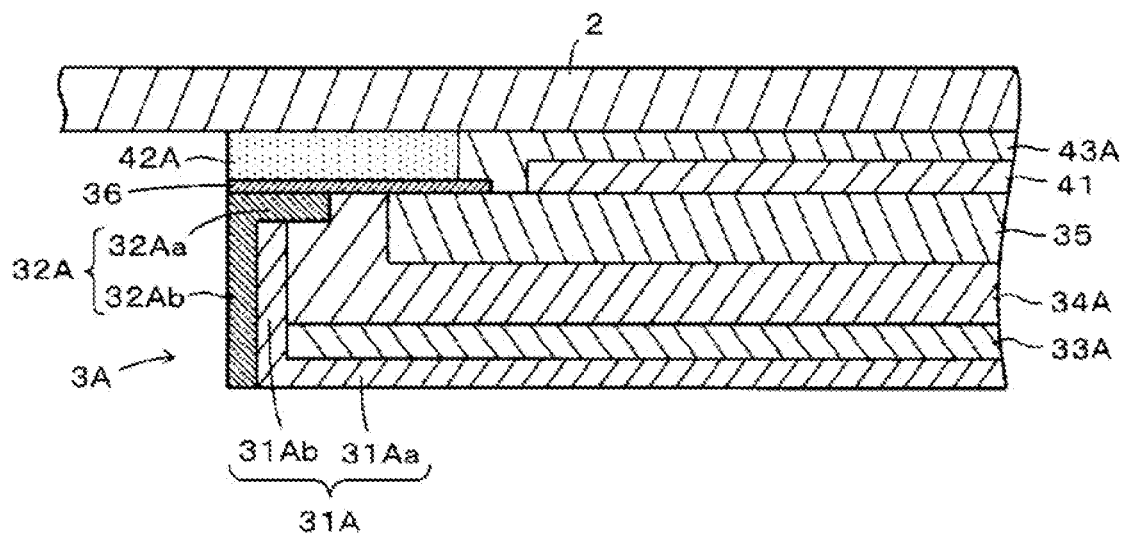
FIGS. 3A and 3B are diagrams for explaining a first embodiment of a position detector according to this invention.
Figure 3B:
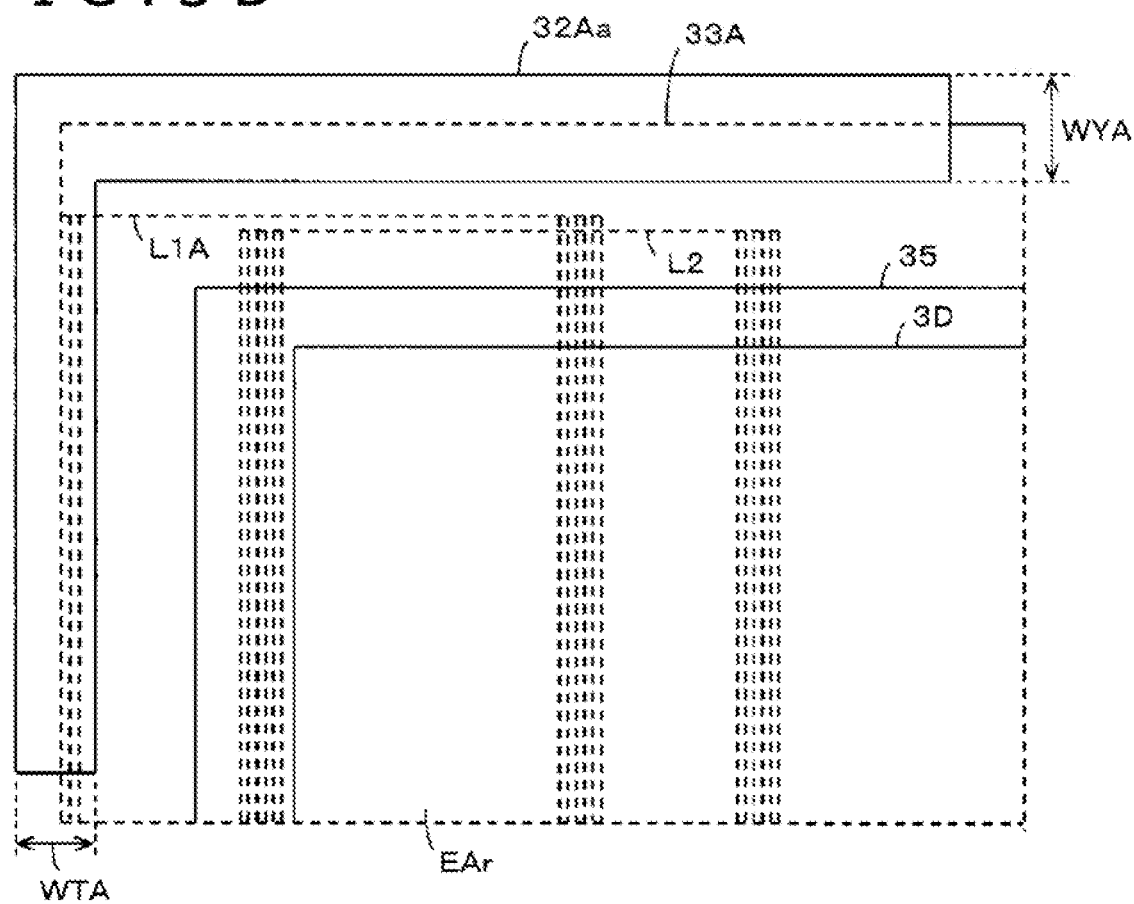

FIGS. 3A and 3B are diagrams for explaining the position detector 3A of the first embodiment. FIG. 3A is a sectional view of the left end side of the position detector 3A, and FIG. 3B is a diagram depicting a configuration when the upper left end part of the position detector 3A is viewed from the upper side thereof. In FIGS. 3A and 3B, a part configured similarly to the existing position detector 3 described by using FIGS. 6A and 6B is given the same reference numeral such that the same parts and different parts may be clear when comparison with the existing position detector 3 depicted in FIGS. 6A and 6B is made.

As depicted in FIG. 3A, the position detector 3A of the first embodiment has a configuration in which a stacking body obtained by stacking a position detecting sensor 33A, a resin frame (plastic layer) 34A, and a display component (LCD part) 35 in that order from the lower side is clamped by a back bezel 31A and a front bezel 32A and an auxiliary member 36. The LCD part 35 is one example of a thin display component and is configured through stacking of liquid crystal cell, backlight, optical film, and so forth similarly to the case of the position detector 3 depicted in FIGS. 6A and 6B. Furthermore, also in this first embodiment, a display device is configured through stacking of the LCD part that is a display component on the resin frame 34. The resin frame 34 has also a function of stably holding the LCD part 35 and preventing leakage of light from the backlight of the LCD part 35.

The back bezel 31A is a component comprising a bottom plate 31Aa and a side surface frame part 31Ab and has a tray shape. The front bezel 32A is a component comprising an upper surface frame part 32Aa and a side surface frame part 32Ab and has a picture frame shape. The inside of the upper surface frame part 32Aa is an opening part to allow a display screen 3D of the LCD part 35 to be exposed. The auxiliary member 36 is a component with a tape shape in this first embodiment.

The back bezel 31A and the front bezel 32A are components made of a metal and are not easily deformed. Furthermore, the auxiliary member 36 with a tape shape is a non-metallic component and is formed of a material that does not affect transmission and reception of a magnetic field (signal) between each loop coil of the position detecting sensor 33A and the electronic pen 5. Specifically, the auxiliary member 36 with a tape shape is a hard tape obtained by applying an adhesive to a bonding surface (surface opposed to the upper surface frame part 32Aa, the resin frame 34A, and the LCD part 35) of a hard resin for example. The auxiliary member 36 with a tape shape may be not a component based on the hard material but a so-called packing tape, vinyl tape, or the like as long as it has a sufficient adhesive force.

Furthermore, in the position detector 3A of the first embodiment depicted in FIGS. 3A and 3B, the difference from the existing position detector 3 depicted in FIGS. 6A and 6B is that, first, the protrusion of the upper surface frame part 32Aa of the front bezel 32A is short and does not reach the LCD part 35. Therefore, in the case of the position detector 3A of the first embodiment, it is impossible to clamp all of the position detecting sensor 33A, the resin frame 34A, and the LCD part 35 by the back bezel 31A and the front bezel 32A.

So, as depicted in FIG. 3A, the shape of the resin frame 34A is adjusted in such a manner that the upper surface of the upper surface frame part 32Aa of the front bezel 32A, the upper surface of the LCD part 35, and the upper surface of the part of the resin frame 34A located between them are located in the same plane. Furthermore, as depicted in FIG. 3A, the auxiliary member 36 with a tape shape is stuck to the upper surface of the upper surface frame part 32Aa of the front bezel, the upper surface of the LCD part 35, and the upper surface of the part of the resin frame 34A located between them.

In this case, the resin frame 34A is clamped by the back bezel 31A and the front bezel 32A. Thus, as depicted in FIG. 3A, the upper surface of each of the upper surface frame part 32Aa of the front bezel 32A, the resin frame 34A, and the LCD part 35 is stuck to the auxiliary member 36 with a tape shape. This can rigidly fix the display device comprising the LCD part 35 and the resin frame 34A to the front bezel 32A.

As above, in the case of the position detector 3A of this first embodiment, the resin frame 34A and the part outside an effective display area EAr in the LCD part 35 are stuck to the auxiliary member 36 with a tape shape and thereby the integrated display device is obtained. Furthermore, the position detecting sensor 33A and the resin frame 34A are clamped by the back bezel 31A and the front bezel 32A having the upper surface frame part 32Aa with a greatly reduced width. Thereby, a position detector obtained by integrating the position detecting sensor 33A and the display device comprising the resin frame 34A and the LCD part 35 is configured. As above, the position detector 3A of the first embodiment is greatly different from the case of the existing position detector 3 depicted in FIGS. 6A and 6B in that the integrated position detector 3A is configured by using the auxiliary member 36.

In the case of this first embodiment, as depicted in FIG. 3A, the auxiliary member 36 is stuck to the upper surface frame part 32Aa of the front bezel 32A, the resin frame 34A, and the part outside the effective display area EAr in the LCD part 35. However, the upper surface frame part 32Aa of the front bezel 32A can directly press the resin frame 34A. For this reason, it suffices for the auxiliary member 36 with a tape shape to connect at least the resin frame 34A and the part outside the effective display area EAr in the LCD part 35 to configure the integrated display device.

However, as depicted in FIG. 3A, the integration of the position detector 3A can be enhanced due to the sticking of the auxiliary member 36 to the upper surface frame part 32Aa of the front bezel 32A, the resin frame 34A, and the part outside the effective display area EAr in the LCD part 35. Therefore, the position detector 3A may be configured in which the position detecting sensor 33A and the display device comprising the resin frame 34A and the LCD part 35 are clamped by the back bezel 31A and the front bezel 32A and the auxiliary member 36 that acts on the front bezel 32A. Although FIG. 3A depicts only the left part of the position detector 3A, the position detector 3A has a similar configuration also at each of four sides of the position detector 3A.

Furthermore, in the case of mounting the position detector 3A of the first embodiment in electronic equipment, a polarization film 41 is disposed on the display screen of the LCD part 35 as depicted in FIG. 3A. Moreover, a sponge (PORON) 42A is disposed on the upper side of the auxiliary member 36 with a tape shape and at a part ranging from the upper surface frame part 32Aa of the front bezel 32A to the LCD part 35. In addition, a surface glass 2 is placed on the sponge 42A. The upper surface of this surface glass 2 serves as the operation surface based on the electronic pen 5. The space between the polarization film 41 and the surface glass 2 is left as an air layer in some cases. However, in this embodiment, the space is filled with a resin material, and a resin material layer 43A is made by so-called direct bonding to reduce eyesore reflections and so forth.

FIG. 3B depicts a configuration when the upper left end part of the position detector 3A described by using FIG. 3A is viewed from the upper side thereof. Parts that are actually visible are depicted by solid lines, and parts that are invisible because another constituent part exists on the upper side are depicted by dotted lines. Furthermore, for simplification of description, diagrammatic representation of the auxiliary member 36 with a tape shape, which does not affect transmission and reception of a magnetic field (signal), is omitted. As depicted in FIG. 3B, the upper surface frame part 32Aa of the front bezel 32A is located at the uppermost part, and the LCD part 35 is located in such a manner that the display screen 3D is exposed from the opening part formed to be surrounded by the upper surface frame part 32Aa. The inside of the display screen 3D of the LCD part 35 is the effective display area EAr.

Furthermore, on the lower side of the LCD part 35, the position detecting sensor 33A formed by disposing plural loop coils in the X-axis direction (horizontal direction) and the Y-axis direction (vertical direction) at predetermined intervals is located with the intermediary of the resin frame 34A. The configuration of the position detecting sensor 33A is almost the same as the position detecting sensor 33 of the position detector 3 described by using FIG. 6B. However, as described in detail later, the way of disposing covered conductor lines forming the loop coils located at the endmost parts of four sides of the position detecting sensor 33A, such as a loop coil L1A to be described later, is different from the existing position detecting sensor 33 depicted in FIGS. 6A and 6B. Also in FIG. 3B, for simplification of description, loop coils L1A and L2 disposed in the X-axis direction (horizontal direction) are depicted, and diagrammatic representation of the loop coils disposed in the Y-axis direction (vertical direction) is omitted.

In the case of the example depicted in FIG. 3B, in the loop coil L1A of the X-axis direction loop coil group, the left part is located at the left end of the position detecting sensor 33A (part outside the LCD part 35), and the right part is located in the effective display area EAr of the display screen 3D of the LCD part 35. Furthermore, in the loop coil L2 of the X-axis direction loop coil group, the left part is located outside the effective display area EAr of the display screen 3D of the LCD part 35 and near the left end of the effective display area EAr, and the right part is located in the effective display area EAr of the display screen 3D of the LCD part 35.

Furthermore, as depicted in FIG. 3B, widths WTA and WYA of the upper surface frame part 32Aa of the front bezel 32A are greatly smaller than the widths WT and WY of the upper surface frame part 32a of the front bezel 32 of the position detector 3 depicted in FIG. 6B. In this case, the left part of the loop coil L1A of the X-axis direction loop coil group is covered by the upper surface frame part 32Aa of the front bezel 32A. However, the left part of the loop coil L2 of the X-axis direction loop coil group is not covered by the upper surface frame part 32Aa of the front bezel 32A. For this reason, between the left part of the loop coil L2 of the X-axis direction loop coil group and the electronic pen 5, the upper surface frame part 32Aa of the front bezel 32A does not serve as a blocking object, and therefore, it is possible to properly carry out transmission and reception of the magnetic field (signal).

Due to this, in the vicinity of a vertical line VL that is an end part of the effective display area EAr, the position indicated by the electronic pen 5 can be properly detected by the above-described two-point method based on the magnetic field (signal) from the electronic pen 5 received by the left part of the loop coil L2 and the right part of the loop coil L1A. Furthermore, in the case of the position detector 3A of the first embodiment, the resin frame 34A and the LCD part 35 are connected by using the auxiliary member 36. Moreover, the position detecting sensor 33A and the resin frame are clamped by the back bezel 31A and front bezel 32A having the upper surface frame part 32Aa with the greatly reduced width. Thereby, the position detector as one electronic part including the position detecting sensor 33A and the display device (resin frame 34A and LCD part 35) is implemented.

Although the left end part of the position detector 3A is described here, a similar configuration is made also at all of right end part, upper end part, and lower end part of the position detector 3A. Due to this, also in the vicinity of the end part of any of four sides of the effective display area EAr, the position indicated by the electronic pen 5 can be properly detected by the above-described two-point method.

Figure 4:
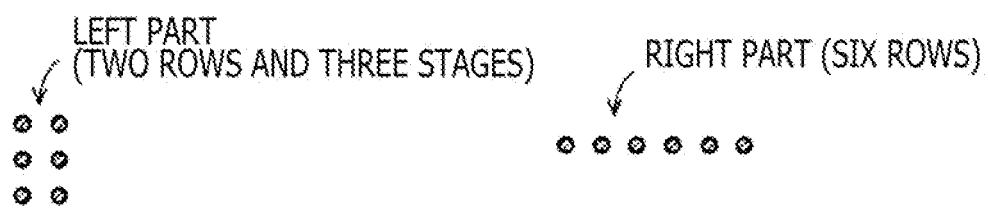
FIG. 4 is a diagram for explaining a disposing example of a loop coil at the leftmost end of the position detector of the first embodiment.

However, in order to sufficiently reduce the width WTA of the upper surface frame part 32Aa of the front bezel 32A, the disposing width of the left end part of the loop coil L1A of the position detecting sensor 33A is set small in the position detector 3A of the first embodiment. FIG. 4 is a diagram for explaining a disposing example of the loop coil L1A at the leftmost end of the position detecting sensor 33A used in the position detector 3A of the first embodiment and depicts a sectional view of the loop coil L1A.

The loop coils L1 and L2 configuring the existing position detecting sensor 33 depicted in FIGS. 6A and 6B are both loop coils of six turns. In the loop coils L1 and L2, both the left part and the right part have a configuration in which six covered conductor lines forming the loop coil are arranged in the horizontal direction. Furthermore, the loop coils L1A and L2 of the position detecting sensor 33A of the position detector 3A of the first embodiment are also loop coils of six turns. However, the way of disposing the covered conductor of the loop coil L1A is different from the existing way.

Specifically, in the loop coil L1A, as depicted in FIG. 3B and FIG. 4, the right part has a configuration in which the six covered conductor lines forming the loop coil are arranged in the horizontal direction. However, the left part of the loop coil L1A has a configuration in which the six covered conductor lines forming the loop coil are arranged on two rows in the horizontal direction and at three stages in the vertical direction. Due to this, the arrangement width of the left part of the loop coil L1A in the horizontal direction is shortened to about one-third of the arrangement width of the six covered conductor lines horizontally arranged, which can contribute to reducing the width WTA of the upper surface frame part 32Aa of the front bezel 32A. This is the same also regarding the right end side, the upper end side, and the lower end side of the upper surface frame part 32Aa of the front bezel 32A.

Furthermore, the receiving function of the magnetic field (signal) of the whole of the loop coil L1A is not deteriorated even when the six covered conductor lines forming the loop coil are arranged on two rows in the horizontal direction and at three stages in the vertical direction regarding the left part of the loop coil L1A as depicted in FIG. 3B and FIG. 4. This can effectively prevent erroneous detection of the position indicated by the electronic pen 5 at a left end part, a right end part, an upper end part, and a lower end part of the position detecting sensor 33A.

Configuration of Position Detector of Second Embodiment

In the position detector 3A described by using FIGS. 3A and 3B, the auxiliary member 36 with a tape shape is used. However, the configuration is not limited thereto. For example, it is also possible to configure the position detector by using an auxiliary member formed into a hard plate shape. The configuration of a position detector 3B of a second embodiment configured by using an auxiliary member 36A with a hard plate shape instead of the auxiliary member 36 with a tape shape will be described below.

Figure 5:
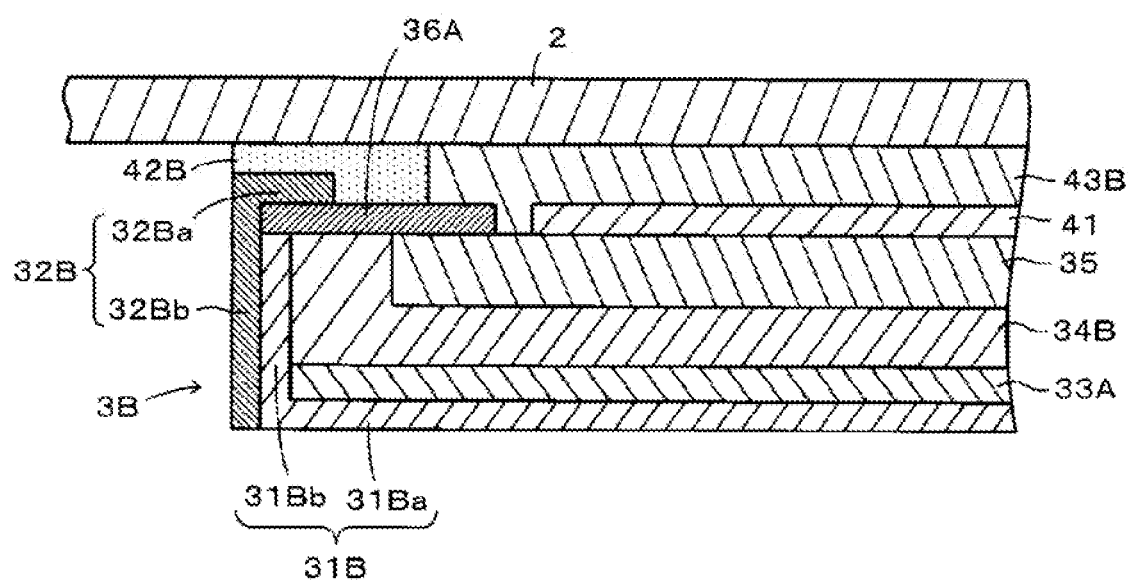
FIG. 5 is a diagram for explaining a second embodiment of the position detector of the embodiment.

FIG. 5 is a diagram for explaining the position detector 3B of the second embodiment and is a sectional view of the left end side of the position detector 3B. In FIG. 5, a part configured similarly to the position detectors 3 and 3A described by using FIG. 6A and FIG. 3A is given the same reference numeral such that the same parts and different parts may be clear when comparison with these position detectors 3 and 3A is made.

As depicted in FIG. 5, the position detector 3B of the second embodiment has a configuration in which a stacking body obtained by stacking a position detecting sensor 33A, a resin frame (plastic layer) 34B, and an LCD part 35 in that order from the lower side is clamped by a back bezel 31B and a front bezel 32B and an auxiliary member 36A. The LCD part 35 is one example of a thin display component and is the same unit as those in the position detector 3 depicted in FIGS. 6A and 6B and the position detector 3A depicted in FIGS. 3A and 3B. Therefore, also in the case of this second embodiment, a display device is configured through stacking of the LCD part 35 on the resin frame 34B.

The back bezel 31B is a component comprising a bottom plate 31Ba and a side surface frame part 31Bb and has a tray shape. The front bezel 32B is a component comprising an upper surface frame part 32Ba and a side surface frame part 32Bb and has a picture frame shape. The inside of the upper surface frame part 32Ba is an opening part to allow a display screen 3D of the LCD part 35 to be exposed. The auxiliary member 36A is a component with a hard plate shape in this second embodiment. Specifically, the auxiliary member 36A is a hard component that is formed of a polyethylene terephthalate (PET) resin and is not deformed even when being pressed.

The back bezel 31B and the front bezel 32B are components made of a metal and are not easily deformed. Furthermore, the auxiliary member 36A with a hard plate shape is a non-metallic component of a PET resin or the like as described above and is formed of a material that does not affect transmission and reception of a magnetic field (signal) between the loop coils configuring the position detecting sensor 33A and the electronic pen 5. Thus, the auxiliary member 36A is not limited to the PET resin and can be formed by various hard materials other than the metal, such as other hard resins and woods.

Furthermore, also in the position detector 3B of the second embodiment depicted in FIG. 5, the protrusion (width) of the upper surface frame part 32Ba of the front bezel 32B is short and does not reach the upper side of the LCD part 35 similarly to the case of the position detector 3A of the first embodiment depicted in FIGS. 3A and 3B. The position detector 3B of the second embodiment is greatly different from the existing position detector 3 depicted in FIGS. 6A and 6B in this point. Therefore, also in the case of the position detector 3B of the second embodiment, it is impossible to clamp all of the position detecting sensor 33A, the resin frame 34B, and the LCD part 35 by the back bezel 31B and the front bezel 32B.

In view of this, the height of the side surface of the back bezel 31B and the shape of the resin frame 34B are adjusted in such a manner that the upper surface of the side surface frame part 31Bb of the back bezel 31B, the upper surface of the LCD part 35, and the upper surface of the part of the resin frame 34B located between them are located in the same plane. Furthermore, as depicted in FIG. 5, the auxiliary member 36A with a hard plate shape is placed on the upper surface of the side surface frame part 31Bb of the back bezel 31B, the upper surface of the LCD part 35, and the upper surface of the part of the resin frame 34B located between them. In addition, the auxiliary member 36A is pressed by the lower surface of the upper surface frame part 32Ba of the front bezel 32B.

As above, in the case of the position detector 3B of this second embodiment, the resin frame 34B and the part outside the effective display area EAr in the LCD part 35 are connected by using the auxiliary member 36A with a plate shape. Furthermore, the position detecting sensor 33A and the resin frame 34B are clamped by the back bezel 31B and the front bezel 32B having the upper surface frame part 32Ba with a greatly reduced width. Because the auxiliary member 36A exists on the resin frame 34B, the position detecting sensor 33A and the display device (resin frame 34B and LCD part 35) are clamped by the back bezel 31B and the front bezel 32B. This can configure the position detector 3B obtained by integrating the position detecting sensor 33A and the display device comprising the resin frame 34B and the LCD part 35. As above, the position detector 3B of the second embodiment is greatly different from the case of the existing position detector 3 depicted in FIGS. 6A and 6B in that the integrated position detector 3B is configured by using the auxiliary member 36A.

In the case of this second embodiment, as depicted in FIG. 5, the auxiliary member 36A exists on the upper surface of the side surface frame part 31Bb of the back bezel 31B, the upper surface of the LCD part 35 outside the effective display area EAr, and the upper surface of the part of the resin frame 34B located between them. However, the configuration is not limited thereto. It suffices that the auxiliary member 36A exists on the upper surface of the part of the resin frame 34B and the upper surface of the LCD part 35 outside the effective display area EAr and can be pressed by the front bezel 32B having the upper surface frame part 32Ba that reaches the part of the resin frame 34B. Therefore, the auxiliary member 36A does not necessarily need to cover the upper surface of the side surface frame part 31Bb of the back bezel 31B.

Accordingly, the auxiliary member 36A acts on the upper surface frame part 32Ba of the front bezel 32B, and the position detecting sensor 33A and the display device (resin frame 34B and LCD part 35) can be clamped by the back bezel 31B and the front bezel 32B and the auxiliary member 36A. This can configure the position detector 3B obtained by integrating the position detecting sensor 33A and the display device (resin frame 34B and LCD part 35).

Although FIG. 5 depicts only the left end side of the position detector 3B, the position detector 3B has a similar configuration also regarding the right end side, the upper end side, and the lower end side. That is, also on the right end side, the upper end side, and the lower end side of the position detector 3B, the position detector 3B has the configuration in which the above-described stacking body is clamped by the back bezel 31B and the front bezel 32B and the auxiliary member 36A that acts on the front bezel 32B.

Furthermore, also in the case of mounting the position detector 3B of the second embodiment in electronic equipment, a polarization film 41 is disposed on the display screen of the LCD part 35 as depicted in FIG. 5. Moreover, a sponge (PORON) 42B is disposed on the upper surface frame part 32Ba of the front bezel 32B and on the upper side of the auxiliary member 36A. In addition, a surface glass 2 is placed on the sponge 42B. The upper surface of this surface glass 2 serves as the operation surface based on the electronic pen 5. The space between the polarization film 41 and the surface glass 2 is left as an air layer in some cases. However, also in this second embodiment, the space is filled with a resin material, and a resin material layer 43B is made by so-called direct bonding to reduce eyesore reflections and so forth.

Moreover, also in the case of the position detector 3B of this second embodiment, the configuration when the upper left end part thereof is viewed from the upper side thereof is similar to that of the case of the position detector 3A of the first embodiment depicted in FIG. 3B. Specifically, the position detector 3B of this second embodiment is what is obtained by replacing the auxiliary member 36 with a tape shape in the position detector 3A of the first embodiment by the auxiliary member 36A with a hard plate shape. The auxiliary member 36A is also a component formed of a non-metallic material and thus does not inhibit transmission and reception of a signal between the loop coils of the position detecting sensor 33A and the electronic pen.

For this reason, also in the case of the position detector 3B of this second embodiment, the same effect as the position detector 3A of the first embodiment described by using FIG. 3B is obtained. Specifically, as described by using FIG. 3B, in the vicinity of the left end part of the effective display area EAr, it becomes possible to properly carry out transmission and reception of a signal between the electronic pen 5 and the left part of the loop coil L2 and the right part of the loop coil L1A.

Due to this, in the vicinity of the left end part of the effective display area EAr, the position indicated by the electronic pen 5 can be properly detected by the above-described two-point method. Although the left end part of the position detector 3B is described here, a similar configuration is made also at all of the right end part, the upper end part, and the lower end part of the position detector 3B. Due to this, also in the vicinity of the end part of any of four sides of the effective display area EAr, the position indicated by the electronic pen 5 can be properly detected by the above-described two-point method.

Furthermore, also in the case of the position detector 3B of this second embodiment, at the left end part, the right end part, the upper end part, and the lower end part, the covered conductors located at the end part of the loop coil are arranged also in the vertical direction as described by using FIG. 4. This can reduce the width of the upper surface frame part 32Ba of the front bezel 32B. Moreover, erroneous detection of the position indicated by the electronic pen 5 at the left end part, the right end part, the upper end part, and the lower end part of the position detector 33B can be effectively prevented without deterioration of the function of the loop coils located at the left end part, the right end part, the upper end part, and the lower end part.

Effects of Embodiments

In the position detectors 3A and 3B of the above-described first and second embodiments, outside the effective display area EAr of the display screen 3D, the part of the loop coil located near an end part of the effective display area EAr is not covered by the upper surface frame part 32Aa or 32Ba. Thus, it is possible to properly carry out transmission and reception of a signal between the part of the loop coil located near the end part of the effective display area EAr and the electronic pen 5 outside the effective display area EAr. This makes it possible to properly detect the position indicated by the electronic pen 5 at the end part of the effective display area EAr of the display screen 3D by using the two-point method, so that the position detector with high reliability can be implemented.

Furthermore, in the case of the first embodiment, the position detecting sensor 33A and the display device comprising the resin frame 34A and the LCD part 35 can be rigidly clamped by the back bezel 31A and the front bezel 32A and the auxiliary member 36, and the integrated position detector 3A can be configured. Similarly, in the case of the second embodiment, the position detecting sensor 33A and the display device comprising the resin frame 34B and the LCD part 35 can be rigidly clamped by the back bezel 31B and the front bezel 32B and the auxiliary member 36A, and the integrated position detector 3B can be configured.

Modification Examples

In the above-described embodiments, it is explained that an LCD is used as the display component of the display device. However, the display component is not limited thereto. As the display component of the display device mounted in the position detector, a so-called flat panel display or the like with a thin configuration including a flat display screen, such as an organic EL display, a field emission display (FED), or an electronic paper, can be used, for example.

Furthermore, the loop coils of the position detecting sensor are not limited to loop coils of six turns, and it is also possible to use loop coils of N (N is an integer equal to or larger than one) turns.

In addition, when the position detecting sensor has high transparency, it is also possible to dispose the position detecting sensor on the upper side (as an upper layer) of the display device to configure the position detector. In this case, the positions of the position detecting sensor 33A and the LCD part 35 are reversed in the position detectors 3A and 3B depicted in FIG. 3A and FIG. 5.

Moreover, corresponding parts such as the back bezels 31A and 31B, the front bezels 32A and 32B, the resin frames 34A and 34B, the sponges 42A and 42B, and the resin material layers 43A and 43B are parts that exert the same functions although being different in the shape. Furthermore, the resin frames 34A and 34B have roles in preventing leakage of light from the backlight and separating the position detecting sensor 33A and the LCD part 35 such that they may be prevented from affecting each other. Thus, these frames can be configured by not only plastic but also various materials as long as they can exert functions equivalent to those of the resin frames 34A and 34B.

Similarly, because having a role as a buffering material, the sponges 42A and 42B are not limited to PORON or the like and it is also possible to replace them by what can implement functions equivalent to those of PORON, such as sea sponge, sea-sponge-shaped component made by a synthetic resin or the like, and felt, for example.

Furthermore, although it is explained that the back bezels 31A and 31B and the front bezels 32A and 32B are all components made of a metal, they are not necessarily limited thereto. For example, the back bezels 31A and 31B and the front bezels 32A and 32B may be a hard resin into which metal powders or carbon is evenly mixed to give electrical conductivity thereto, or the like. That is, embodiments of the present disclosure can be applied when the back bezels 31A and 31B and the front bezels 32A and 32B are formed of a material that has sufficient hardness and possibly affects transmission and reception of a magnetic field (signal) between the loop coils of the position detecting sensor 33A and the electronic pen 5.

Others

As is understood also from the explanation of the above-described embodiments, the part comprising the resin frame 34A or 34B and the LCD part 35 in the embodiments implements functions of the display device in the claims, and the position detecting sensor 33A in the embodiments implements functions of the position detecting sensor. Furthermore, the back bezels 31A and 31B in the embodiments implement the lower holding member of the claims, and the front bezels 32A and 32B in the embodiments implement the upper holding member, and the auxiliary members 36 and 36A in the embodiments implement the auxiliary member. Moreover, the upper surface frame parts 32Aa and 32Ba of the front bezels 32A and 32B implement functions of the frame part at the periphery of the opening part of the upper holding member in the claims.

It is to be noted that the embodiment of the present disclosure is not limited to the foregoing embodiment, and that various changes can be made without departing from the spirit of the present disclosure. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

Accordingly, the claims are not limited by the disclosure.

The invention claimed is:

1. A position detector, comprising:
a display device including:
    a display component having a flat display screen, and
    a resin frame that fixes the display component;
a position detecting sensor comprising a plurality of loop coils arranged in each of a first direction and a second direction that intersect each other and disposed on a lower side of the display device in a stacking manner, wherein the position detecting sensor is configured to detect an indicated position in an effective display area on the display screen;
a lower holding member on the lower side of the display device and the position detecting sensor;
an upper holding member that is formed of a metal material and has an opening part that exposes the display screen, the upper holding member being on an upper side of the display device and the position detecting sensor;
an auxiliary member that is formed of a material that does not affect reception of a signal through the plurality of loop coils, wherein the auxiliary member covers a part of the display component and the resin frame and is configured to fix the display component and the resin frame; and
a frame part at a periphery of the opening part of the upper holding member that covers part of the resin frame, wherein the display device is fixed by the lower holding member and the upper holding member,
wherein an outermost loop coil of the plurality of loop coils includes a first part and a second part, wherein the first part has a first width and the second part has a second width, wherein the first width is less than the second width, wherein the frame part of the upper holding member covers the first part of the outermost loop coil.

2. The position detector according to claim 1, wherein the auxiliary member fixes the display component and the resin frame from a side of the display screen of the display device fixed by the lower holding member and the upper holding member.

3. The position detector according to claim 1, wherein the auxiliary member is disposed between the upper holding member and the resin frame, wherein the position detecting sensor is fixed, and wherein the display component and the resin frame are fixed by the lower holding member and the upper holding member.

4. The position detector according to claim 1, wherein a loop coil of the plurality of loop coils that is adjacent the outermost loop coil is not covered by the frame part of the upper holding member.

5. The position detector according to claim 1, wherein the auxiliary member is a vinyl tape layer.

6. The position detector according to claim 1, wherein the auxiliary member is a tape-shaped member that is coupled to an upper surface of the frame part of the upper holding member and a surface of the flat display screen.

7. The position detector according to claim 1, wherein the auxiliary member is a plate-shaped member that is coupled to a lower surface of the frame part of the upper holding member and a surface of the flat display screen.

8. The position detector according to claim 1, wherein the auxiliary member is a non-metallic component.

9. The position detector according to claim 1, wherein the auxiliary member is an insulative material.

10. The position detector according to claim 1, wherein the auxiliary member comprises an adhesive layer on a resin layer.

11. The position detector according to claim 1, wherein the first part of the outermost loop coil has conductors are arranged in two rows in a horizontal direction and the second part of the outermost loop coil has conductors arranged in single rows in the horizontal direction.

12. The position detector according to claim 11, wherein the first part of the outermost loop coil has three stages in a vertical direction.

* * * * *